(12) United States Patent
Arrico

(10) Patent No.: US 7,694,453 B1
(45) Date of Patent: Apr. 13, 2010

(54) FISHING JIG

(76) Inventor: Thomas Raymond Arrico, P.O. Box 87, Albany, KY (US) 42602-0087

( * ) Notice: Subject to any disclaimer, the term of this patent is extended or adjusted under 35 U.S.C. 154(b) by 37 days.

(21) Appl. No.: 12/050,889

(22) Filed: Mar. 18, 2008

Related U.S. Application Data

(63) Continuation-in-part of application No. 11/383,711, filed on May 16, 2006, now abandoned.

(51) Int. Cl.
*A01K 85/10* (2006.01)
*A01K 85/01* (2006.01)
*A01K 85/00* (2006.01)

(52) U.S. Cl. ............... 43/42.13; 43/42.39; 43/42.06; 43/42.24; 43/42.32; 43/42.42; 43/42.43

(58) Field of Classification Search .......... 43/42.13, 43/42.39, 42.11, 42.24, 42.42, 42.32, 42.06, 43/42.4, 42.43

See application file for complete search history.

(56) References Cited

U.S. PATENT DOCUMENTS

| | | | | |
|---|---|---|---|---|
| 315,967 A * | 4/1885 | Spencer | ...................... | 43/42.2 |
| 1,247,955 A * | 11/1917 | Grube | ...................... | 43/42.26 |
| 1,435,177 A * | 11/1922 | Peckinpaugh | ............... | 43/42.4 |
| 1,457,926 A * | 6/1923 | Dunkelberger | ............. | 43/42.24 |
| 1,611,644 A * | 12/1926 | Johnson | ...................... | 43/42.06 |
| 1,777,004 A * | 9/1930 | Lemere et al. | ............. | 43/42.24 |
| 1,792,366 A * | 2/1931 | Ettles | ...................... | 43/42.26 |
| 1,833,581 A * | 11/1931 | Jordan | ...................... | 43/42.39 |
| 1,857,939 A * | 5/1932 | Cameron | ...................... | 43/42.39 |
| 1,865,359 A * | 6/1932 | Eger | ...................... | 43/42.39 |
| 1,921,176 A * | 8/1933 | Unkefer | ...................... | 43/42.33 |
| 1,976,695 A * | 10/1934 | Boehm | ...................... | 43/42.26 |
| 2,036,954 A * | 4/1936 | Murray | ...................... | 43/42.39 |
| 2,298,811 A * | 10/1942 | Sisco | ...................... | 43/42.34 |
| 2,449,700 A * | 9/1948 | Hubbard | ...................... | 43/42.39 |
| 2,476,934 A * | 7/1949 | Watkins, Sr. | ............... | 43/42.42 |
| 2,492,064 A * | 12/1949 | Rauh | ...................... | 43/42.28 |
| 2,516,399 A * | 7/1950 | Lovelace | ...................... | 43/42.39 |
| 2,549,458 A * | 4/1951 | Grimm | ...................... | 43/42.13 |

(Continued)

FOREIGN PATENT DOCUMENTS

FR     2 569 974     3/1986

(Continued)

*Primary Examiner*—Darren W Ark
(74) *Attorney, Agent, or Firm*—Swift Law Office; Stephen Christopher Swift

(57) ABSTRACT

A fishing lure, comprising a weighted head to which a hook, spinner and weed guard are attached, and three cutouts made of a flexible, absorbent material that are wrapped and tied around a load collar or extension from the head. The cutouts will make the lure resemble a bait fish such as is eaten by the fish that the user wants to catch. The cutouts may be decorated with beads, feathers and paint, to increase the resemblance to bait fish. The wiggling motion of the jig as it is pulled through the water and the rotation of the spinner will attract fish. Scent may be absorbed and released by the cutouts to further attract fish. The head is preferably made from lead, and the cutouts are preferably made from a microfiber fabric. A first preferred embodiment is called the "switch back", and a second preferred embodiment is called the "pop".

7 Claims, 7 Drawing Sheets

U.S. PATENT DOCUMENTS

| | | | | |
|---|---|---|---|---|
| 2,556,683 A * | 6/1951 | Deitz | | 43/42.06 |
| 2,559,434 A * | 7/1951 | Hyland | | 43/42.53 |
| 2,597,792 A * | 5/1952 | Hardy | | 43/42.39 |
| 2,616,559 A * | 11/1952 | Hyland | | 43/42.53 |
| 2,618,095 A * | 11/1952 | Igo | | 43/42.24 |
| 2,632,277 A * | 3/1953 | Cogswell, Sr. et al. | | 43/42.39 |
| 2,633,659 A * | 4/1953 | Baum | | 43/42.39 |
| 2,641,081 A * | 6/1953 | Moore | | 43/42.42 |
| 2,736,123 A * | 2/1956 | Peterson | | 43/42.39 |
| 2,741,058 A * | 4/1956 | Allman et al. | | 43/42.39 |
| 2,770,063 A * | 11/1956 | Martin | | 43/42.39 |
| 2,778,144 A * | 1/1957 | Clyde et al. | | 43/42.28 |
| 2,826,853 A * | 3/1958 | Guy et al. | | 43/42.06 |
| 2,857,703 A * | 10/1958 | Parmlee | | 43/42.28 |
| 2,874,048 A * | 2/1959 | Walldov | | 43/42.06 |
| 2,938,294 A * | 5/1960 | Bachmann | | 43/42.33 |
| 3,060,620 A * | 10/1962 | Binkowski | | 43/42.24 |
| 3,149,434 A * | 9/1964 | Janac | | 43/42.24 |
| 3,191,336 A * | 6/1965 | Cordell, Jr. | | 43/42.24 |
| 3,193,963 A * | 7/1965 | Roedel | | 43/42.39 |
| 3,505,755 A * | 4/1970 | Pearce | | 43/42.06 |
| 3,579,892 A * | 5/1971 | Olvey, Sr. | | 43/42.28 |
| 3,590,514 A * | 7/1971 | Begley | | 43/42.39 |
| 3,693,279 A * | 9/1972 | Mackie | | 43/42.06 |
| 3,724,117 A * | 4/1973 | Flanagan, Jr. | | 43/42.39 |
| 3,828,463 A * | 8/1974 | Perrin | | 43/42.39 |
| 3,835,572 A * | 9/1974 | Mounsey | | 43/42.06 |
| 3,940,869 A * | 3/1976 | Roberts | | 43/42.24 |
| 3,964,203 A * | 6/1976 | Williams, Jr. | | 43/42.06 |
| 3,990,171 A * | 11/1976 | Davis | | 43/42.28 |
| 3,996,688 A * | 12/1976 | Hardwicke, III | | 43/42.28 |
| 4,012,862 A * | 3/1977 | Dubois | | 43/42.06 |
| 4,050,181 A * | 9/1977 | Young et al. | | 43/42.06 |
| 4,074,454 A * | 2/1978 | Cordell, Jr. | | 43/42.28 |
| 4,177,597 A * | 12/1979 | Thomassin | | 43/42.3 |
| 4,219,956 A * | 9/1980 | Hedman | | 43/42.39 |
| 4,245,420 A * | 1/1981 | Carr | | 43/42.06 |
| 4,425,730 A * | 1/1984 | Goetz, Jr. | | 43/42.13 |
| 4,638,586 A * | 1/1987 | Hall | | 43/42.13 |
| 4,689,914 A * | 9/1987 | Quinlan | | 43/42.42 |
| 4,712,325 A * | 12/1987 | Smith | | 43/42.24 |
| 4,736,542 A * | 4/1988 | Floyd | | 43/42.06 |
| 4,744,167 A * | 5/1988 | Steele | | 43/42.06 |
| 4,765,085 A * | 8/1988 | Wotawa et al. | | 43/42.13 |
| 4,845,883 A * | 7/1989 | Langer | | 43/42.39 |
| 4,858,367 A * | 8/1989 | Rabideau | | 43/42.39 |
| 4,901,470 A * | 2/1990 | Gentry | | 43/42.13 |
| 4,908,975 A * | 3/1990 | Root et al. | | 43/42.39 |
| 4,912,871 A * | 4/1990 | Brady | | 43/42.32 |
| 4,962,609 A * | 10/1990 | Walker | | 43/42.06 |
| 5,024,019 A * | 6/1991 | Rust et al. | | 43/42.13 |
| 5,092,073 A * | 3/1992 | Kaecker | | 43/42.39 |
| 5,117,573 A * | 6/1992 | Semler | | 43/42.39 |
| 5,136,801 A * | 8/1992 | Pond | | 43/42.39 |
| 5,172,510 A * | 12/1992 | Lovell, Jr. | | 43/42.06 |
| 5,182,876 A * | 2/1993 | Lewis | | 43/42.39 |
| 5,203,105 A * | 4/1993 | Bond et al. | | 43/42.39 |
| 5,216,830 A * | 6/1993 | Brott, II | | 43/42.39 |
| 5,228,230 A * | 7/1993 | Vaught | | 43/42.39 |
| 5,394,636 A * | 3/1995 | Rabideau | | 43/42.13 |
| 5,412,899 A * | 5/1995 | Reboul | | 43/42.13 |
| 5,491,927 A * | 2/1996 | Ortiz | | 43/42.39 |
| 5,505,015 A * | 4/1996 | Delricco | | 43/42.13 |
| 5,524,377 A * | 6/1996 | Freeman et al. | | 43/42.06 |
| 5,537,775 A * | 7/1996 | Crumrine | | 43/42.39 |
| 5,586,405 A * | 12/1996 | Fike | | 43/42.24 |
| 5,588,246 A * | 12/1996 | Hill | | 43/42.06 |
| 5,588,247 A * | 12/1996 | Wicht | | 43/42.28 |
| 5,628,139 A * | 5/1997 | Rhoten | | 43/42.15 |
| 5,899,015 A * | 5/1999 | Link | | 43/42.39 |
| 5,930,941 A * | 8/1999 | Hayes, II et al. | | 43/42.13 |
| 5,956,886 A * | 9/1999 | Choate | | 43/42.13 |
| 5,974,723 A * | 11/1999 | Taibi | | 43/42.13 |
| 6,009,658 A * | 1/2000 | Firmin | | 43/42.24 |
| 6,079,146 A * | 6/2000 | Larsen | | 43/42.06 |
| 6,154,999 A * | 12/2000 | Woods | | 43/42.39 |
| 6,161,324 A * | 12/2000 | Hugunin | | 43/42.06 |
| 6,182,391 B1 * | 2/2001 | Hubbard | | 43/42.32 |
| 6,199,312 B1 * | 3/2001 | Link | | 43/42.24 |
| 6,212,818 B1 * | 4/2001 | Huddleston | | 43/42.39 |
| 6,374,535 B1 * | 4/2002 | Bailey | | 43/42.11 |
| 6,601,336 B1 * | 8/2003 | Link | | 43/42.13 |
| 6,748,692 B2 * | 6/2004 | Sprouse | | 43/42.13 |
| 6,772,553 B2 * | 8/2004 | Phillips et al. | | 43/42.39 |
| 6,898,894 B1 * | 5/2005 | Anderson | | 43/42.39 |
| 6,962,641 B2 * | 11/2005 | Chocklett et al. | | 43/42.28 |
| 7,010,881 B2 * | 3/2006 | Altman | | 43/42.13 |
| 7,114,285 B1 * | 10/2006 | Ince | | 43/42.24 |
| 7,140,146 B2 * | 11/2006 | Gill | | 43/42.39 |
| 7,140,147 B2 * | 11/2006 | Wacha | | 43/42.39 |
| 2001/0045048 A1 * | 11/2001 | Johnson | | 43/42.39 |
| 2002/0029509 A1 * | 3/2002 | Hugunin | | 43/42.06 |
| 2002/0078619 A1 * | 6/2002 | Hurtle, Jr. | | 43/42.39 |
| 2003/0074828 A1 * | 4/2003 | Sprouse | | 43/42.13 |
| 2005/0183323 A1 * | 8/2005 | Harrell | | 43/42.39 |
| 2006/0042150 A1 * | 3/2006 | Roh | | 43/42.32 |
| 2006/0201050 A1 * | 9/2006 | Troutman | | 43/42.39 |
| 2007/0199233 A1 * | 8/2007 | Higgin | | 43/42.32 |
| 2007/0214709 A1 * | 9/2007 | Shelton et al. | | 43/42.32 |
| 2008/0104879 A1 * | 5/2008 | Poppe | | 43/42.32 |
| 2008/0104880 A1 * | 5/2008 | Hegemier et al. | | 43/42.32 |
| 2008/0148623 A1 * | 6/2008 | Uhrig | | 43/42.39 |
| 2009/0056195 A1 * | 3/2009 | Simmons et al. | | 43/42.32 |
| 2009/0172993 A1 * | 7/2009 | Willis et al. | | 43/42.13 |

FOREIGN PATENT DOCUMENTS

| | | | | |
|---|---|---|---|---|
| FR | 2569947 | A1 * | 3/1986 | |
| FR | 2 593 354 | | 7/1987 | |
| JP | 10234262 | A * | 9/1998 | |
| JP | 2003259765 | A * | 9/2003 | |
| JP | 2004-113038 | | 4/2004 | |
| JP | 2004113038 | A * | 4/2004 | |
| JP | 2004-159633 | | 6/2004 | |
| JP | 2004159633 | A * | 6/2004 | |
| JP | 2004-275161 | | 10/2004 | |
| JP | 2004275161 | A * | 10/2004 | |
| JP | 2005-185255 | | 7/2005 | |
| JP | 2005185255 | A * | 7/2005 | |
| JP | 2005-210950 | | 8/2005 | |
| JP | 2005210950 | A * | 8/2005 | |

* cited by examiner

FISHING JIG

CROSS REFERENCE TO RELATED APPLICATION

This application is a Continuation-In-Part of Regular Utility patent application Ser. No. 11/383,711, filed May 16, 2006, which is incorporated herein by reference.

BACKGROUND OF THE INVENTION

1. Field of the Invention

The present invention relates to fishing lures.

2. Description of the Prior Art

There are numerous fishing lures in the prior art, but none that are equivalent to the present invention.

U.S. Pat. No. 315,967, issued on Apr. 14, 1885, to Clare L. Spencer, discloses a combination fish hook, with multiple hooks and spinners.

U.S. Pat. No. 1,247,955, issued on Nov. 27, 1917, to William J. Grube, discloses an artificial bait, including a piece of rubber or other elastic material in the shape of a crawfish or other shape with a body and branches, attached to a fish hook.

U.S. Pat. No. 1,435,177, issued on Nov. 14, 1922, to Ernest Hilary Peckinpaugh, discloses an artificial fishing bait, with a body, hook, eye, a bunch of bucktail or other hairs, a spiral winding of silk thread, and side wings of hair or feathers.

U.S. Pat. No. 1,457,926, issued on Jun. 5, 1923, to Milton S. Dunkelberger, discloses a casting lure, with wing pieces made of celluloid or waxed paper.

U.S. Pat. No. 1,611,644, issued on Dec. 21, 1926, to Otis Johnson, discloses a fish lure that can rotate to simulate the movements of a frightened fish.

U.S. Pat. No. 1,777,004, issued on Sep. 30, 1930, to Lou S. Lemere and Walter M. Long, discloses a fish lure having a metal strip embedded in a flat body of flexible material.

U.S. Pat. No. 1,792,366, issued on Feb. 10, 1931, to George R. Ettles, discloses a fish lure with a series of body members resembling a shrimp. It does not disclose the use of cyanoacrylate glue, nor the use of cutouts having the shapes of those in the instant invention.

U.S. Pat. No. 1,833,581, issued on Nov. 24, 1931, to William M. Jordan, discloses a fishing lure, with an elongated plate body.

U.S. Pat. No. 1,857,939, issued on May 10, 1932, to Frederick C. Cameron, discloses an artificial fish bait, having a wire below its body, on which are weights that can slide back and forth to cause the body to imitate motions of a fish.

U.S. Pat. No. 1,865,359, issued on Jun. 28, 1932, to William F. Eger, discloses a fish bait, having a frusto-conical head, with a hook and ribbons or streamers extending from the rear of the head, and a spinner before the head.

U.S. Pat. No. 1,921,176, issued on Aug. 8, 1933, to George R. Unkefer, discloses a fishing lure in which two sides of a piece of flexible material resembling a minnow may be secured to a rawhide reinforcement by waterproof glue. The use of cyanoacrylate glue, as in the instant invention, is not disclosed.

U.S. Pat. No. 1,976,695, issued on Oct. 9, 1934, to George P. Boehm, discloses a fishing lure with metal plates and sheets of rubber resembling aquatic prey. It does not disclose the use of cyanoacrylate glue, nor the use of cutouts having the shapes of those in the instant invention.

U.S. Pat. No. 2,036,954, issued on Apr. 7, 1936, to John William Murray, discloses a fishing lure with a pear-shaped body.

U.S. Pat. No. 2,298,811, issued on Oct. 13, 1948, to Alexander Sisco, discloses a frog-shaped fish lure made of wood and sponge rubber, with hooks extending from the front and rear of the frog.

U.S. Pat. No. 2,492,064, issued on Dec. 20, 1949, to Herbert H. Rauh, discloses a fishing bait having a flat portion and flexible extensions.

U.S. Pat. No. 2,516,399, issued on Jul. 25, 1950, to Charles D. Lovelace, discloses a fish lure, including a metal body to which are attached a flag and a fish hook.

U.S. Pat. No. 2,549,458, issued on Apr. 17, 1951, to Cliel L. Grimm, discloses a weedless fish bait, adapted for use with pork rind strips.

U.S. Pat. No. 2,556,683, issued on Jun. 12, 1951, to Henry P. Deitz, discloses a fishing lure with a hollow body simulating a fish.

U.S. Pat. No. 2,559,434, issued on Jul. 3, 1951, to Daniel F. Hyland, discloses a cutting guide for cutting fishing bait.

U.S. Pat. No. 2,597,792, issued on May 20, 1952, to John James Hardy, discloses a fish lure made in two parts hinged together to simulate a headless shrimp.

U.S. Pat. No. 2,616,559, issued on Nov. 4, 1952, to Daniel F. Hyland, discloses packaging of fishing lures that are made of flexible sheet metal.

U.S. Pat. No. 2,618,095, issued on Nov. 18, 1952, to Robert K. Igo, discloses a weed-free fishhook and lure, with a protective apron formed of a thin flat sheet of flexible rubber.

U.S. Pat. No. 2,632,277, issued on Mar. 24, 1953, to Wilton W. Cogswell, Sr. and Walter F. Cogswell, discloses a U-shaped fishing lure with multiple hooks.

U.S. Pat. No. 2,633,659, issued on Apr. 7, 1953, to John W. Baum, discloses a fish lure, with a plastic, wood or metal body portion, a detachable stabilizer plate, and a hook supporting body and stabilizing wire leader.

U.S. Pat. No. 2,641,081, issued on Jun. 9, 1953, to Henry S. Moore, discloses a fishing lure with a loop-shaped weed guard.

U.S. Pat. No. 2,741,058, issued on Apr. 10, 1956, to Jack S. Allman, discloses a fishing lure, comprising a core around which is placed a raw salmon skin.

U.S. Pat. No. 2,770,063, issued on Nov. 13, 1956, to William F. Martin, discloses an artificial fishing lure, with an articulated body resembling a shrimp, having a spring mounted actuating rod.

U.S. Pat. No. 2,778,144, issued on Jan. 22, 1957, to R. Clyde Jones and Clayton W. Bradshaw, discloses a fishing lure having a circular head and a spinner.

U.S. Pat. No. 2,826,853, issued on Mar. 18, 1958, to Ralph I. Guy and George K. Lait, discloses fish bait and a method for its preparation.

U.S. Pat. No. 2,857,703, issued on Oct. 28, 1958, to David Parmlee, discloses a fishing rig using live bait.

U.S. Pat. No. 2,874,048, issued on Feb. 17, 1959, to Gustav A. Walldov, discloses water-soluble fish bait and a method for making it.

U.S. Pat. No. 2,938,294, issued on May 31, 1960, to Gunnar Bachmann, discloses a fish lure, having a body filled with liquid, two wing-like streamers, and a tail-like streamer attached to a hook.

U.S. Pat. No. 3,060,620, issued on Oct. 30, 1962, to Andrew Binkowski, discloses a weedless hook skirt.

U.S. Pat. No. 3,149,434, issued on Sep. 22, 1964, to John R. Janac, discloses a fishing lure using a narrow, elongated strip of parchment skin as bait.

U.S. Pat. No. 3,191,336, issued on Jun. 29, 1965, to Carl R. Cordell, Jr., discloses a fishing lure with a hook weighted by a body of lead, with a plume or tuft of filaments.

U.S. Pat. No. 3,193,963, issued on Jul. 13, 1965, to Donald G. Roedel, discloses an artificial fishing lure, shaped like a small fish, with fins and a tail, made from a bowed sheet. A hook extends from the lure. The lure is attached to a fishing line by a swivel and leader.

U.S. Pat. No. 3,505,755, issued on Apr. 14, 1970, to John C. Pearce, discloses a fish lure, having a wick-like member saturated with a fish-getting compound inside the lure body.

U.S. Pat. No. 3,579,892, issued on May 25, 1971, to James O. Olvey, Sr., discloses a bead-head fly lure with a dangling spinner.

U.S. Pat. No. 3,590,514, issued on Jul. 6, 1971, to Daniel P. Begley, discloses a fishing lure and a method of making it from shredded rubber.

U.S. Pat. No. 3,693,279, issued on Sep. 26, 1972, to Kenneth Mackle, discloses a sound producing fishing lure.

U.S. Pat. No. 3,724,117, issued on Apr. 3, 1973, to Lindley E. Flanagan, Jr., discloses a fishing jig, having a weight, a hook, and an elongated body of flexible and resilient sheet material.

U.S. Pat. No. 3,828,463, issued on Aug. 13, 1974, to George S. Perrin, discloses a drop spin fishing lure.

U.S. Pat. No. 3,835,572, issued on Sep. 17, 1974, to Reginald Mounsey, discloses a fishing lure having a chamber for dispersible bait.

U.S. Pat. No. 3,940,869, issued on Mar. 2, 1976, to Eldon E. Roberts, discloses an artificial fishing lure formed from a sheet of sponge.

U.S. Pat. No. 3,964,203, issued on Jun. 22, 1976, to William O. Williams, Jr., discloses a fishing lure formed of a strip of flat chamois impregnated with animal blood.

U.S. Pat. No. 3,996,688, issued on Dec. 14, 1976, to James E. Hardwicke, III, discloses a fishing lure having a weighted body and a skirt comprising an attaching sleeve and flexible strands extending from the sleeve. It does not disclose the use of cutouts having the shapes of those in the instant invention, nor the use of cyanoacrylate glue to retain them.

U.S. Pat. No. 4,012,862, issued on Mar. 22, 1977, to Eugene Dubois, discloses an artificial fishing lure with spinners and a weed guard.

U.S. Pat. No. 4,074,454, issued on Feb. 21, 1978, to Carl R. Cordell, Jr., discloses a fishing lure having a plastic multistrand skirt combined with a curled tail made of flat thin plastic.

U.S. Pat. No. 4,177,597, issued on Dec. 11, 1979, to Robert C. Thomassin, discloses a fishing lure simulating lifelike swimming motions of aquatic animals, composed of a strip of flexible material containing two rectilinear components having a variable angle.

U.S. Pat. No. 4,219,956, issued on Sep. 2, 1980, to Dean L. R. Hedman, discloses a weedless changeable plastic lure, having a rounded, segmented forward section, and a flat, undulating rear section.

U.S. Pat. No. 4,245,420, issued on Jan. 20, 1981, to William E. S. Carr, discloses artificial bait for aquatic species.

U.S. Pat. No. 4,425,730, issued on Jan. 17, 1984, to Edward E. Goetz, Jr., discloses a hydrodynamic fishing lure for top water or surface fishing of the "buzzbait" variety.

U.S. Pat. No. 4,638,586, issued on Jan. 27, 1987, to Joseph P. Hall, discloses a fishing lure having a spinner and legs or streamers extending from a weight.

U.S. Pat. No. 4,689,914, issued on Sep. 1, 1987, to Leland F. Quinlan, discloses a variable buoyancy fishing lure having a hollow head member with a vent opening.

U.S. Pat. No. 4,712,325, issued on Dec. 15, 1987, to Charles E. Smith, discloses a fishing lure having strips of chamois that can absorb fish scent attractants. It does not disclose the use of cyanoacrylate glue, nor the use of cutouts having the shapes in the instant invention.

U.S. Pat. No. 4,736,542, issued on Apr. 12, 1988, to John F. Floyd, discloses a scented fishing lure having a rigid absorbent body portion.

U.S. Pat. No. 4,744,167, issued on May 17, 1988, to George Steele, discloses a fishing lure with a keel-stabilized weight in combination with a hook, a weed shield, an absorbent, scent-emitting body, and a multi-leafed skirt. A trailing spinner may also be attached.

U.S. Pat. No. 4,765,085, issued on Aug. 23, 1988, to Fred W. Wotawa and Patrick J. Wotawa, discloses a fishing lure having a vane adapted for oscillating movement, but not for rotational movement.

U.S. Pat. No. 4,845,883, issued on Jul. 11, 1989, Alexander G. Langer, discloses a fishing lure made of a soft, non-rigid material shaped and weighted to glide in water.

U.S. Pat. No. 4,901,470, issued on Feb. 20, 1990, to Donald D. Gentry, discloses a fishing lure having a spinner attached to a coiled spring.

U.S. Pat. No. 4,908,975, issued on Mar. 20, 1990, to Teddy A. Root and Wilbur H. McVay, discloses a bucktail jig and a method of making it, using a hook having a lead-weighted head that is formed with a longer, longitudinally extending bucktail hair mass, coupled with rubber flaps and a shorter, generally omnidirectionally extending mass of rubber strands. It does not disclose the use of cyanoacrylate glue, nor the use of cutouts having the shapes of those in the instant invention.

U.S. Pat. No. 4,912,871, issued on Apr. 3, 1990, to Todd M. Brady, discloses a fishing lure in the configuration of a crab body formed entirely as a unitary member of a soft resilient molding.

U.S. Pat. No. 4,962,609, issued on Oct. 16, 1990, to Russell D. Walker, discloses a scent emitting fish-shaped fishing lure, having a rigid body with recesses on opposite sides filled with a layer of fibrous material impregnated with a fish attracting substance.

U.S. Pat. No. 5,117,573, issued on Jun. 2, 1992, to Harold F. Semler, discloses a fishing lure including a central shank with a hook member mounted at a lower end of the shank, and a support head at an upper end of the shank, with a projection mounted to the support head that includes an aperture for receiving fishing line.

U.S. Pat. No. 5,136,801, issued on Aug. 11, 1992, to Robert B. Pond, discloses a fishing lure designed to be bounced along the bottom of a body of water.

U.S. Pat. No. 5,172,510, issued on Dec. 22, 1992, to Charles F. Lovell, Jr., discloses a semi-artificial fish lure, having a clear body in which is embedded a natural marine food, such as the head of small fish, and streamers extending from the body.

U.S. Pat. No. 5,182,876, issued on Feb. 2, 1993, to Earl L. Lewis, discloses a jigging lure with a T-shaped shank on which a weighted head and a barbed end are balanced about a pivot point.

U.S. Pat. No. 5,203,105, issued on Apr. 20, 1993, to A. Melvin Bond and Jerry M. Bond, discloses a fishing lure in the shape of a horse head.

U.S. Pat. No. 5,216,830, issued on Jun. 8, 1993, to Louis J. Brott, II, discloses a fishing lure having a front blade, a central body, and a trailing hook.

U.S. Pat. No. 5,228,230, issued on Jul. 20, 1993, to Gerald D. Vaught, discloses a fishing lure with a simulacrum of a crawdad or bait fish made of cloth or analogous material.

U.S. Pat. No. 5,394,636, issued on Mar. 7, 1995, to Rabideau, discloses a combination jig and spinner fishing lure, having a jig head, hook, hook dressing, and a spinner.

U.S. Pat. No. 5,412,899, issued on May 9, 1995, to Hauser G. Reboul, discloses an artificial bait with a pair of stabilizing bristles.

U.S. Pat. No. 5,491,927, issued on Feb. 20, 1996, to Philip V. Ortiz, discloses a fishing lure for use with disposable lure bodies having interchangeable skirts placed forward of the mass of the lure.

U.S. Pat. No. 5,524,377, issued on Jun. 11, 1996, to Lynn Freeman and Lyndall Helms, discloses a jig trailer fishing lure made of a synthetic material capable of absorbing water and fish attractant liquids.

U.S. Pat. No. 5,537,775, issued on Jul. 23, 1996, to Douglas L. Crumrine, discloses a weighted jig having a fishhook with an elongated shank, to one end of which is secured a U-shaped hook, with a shoulder attached to the other end.

U.S. Pat. No. 5,586,405, issued on Dec. 24, 1996, to Jody R. Fike, discloses a fishing lure for top water fishing, having a body with a spiral configuration and a longitudinal concave recess, and a bulbous head.

U.S. Pat. No. 5,588,246, issued on Dec. 31, 1996, to Curtis J. Hill, discloses interchangeable eyes for fishing lures.

U.S. Pat. No. 5,628,139, issued on May 13, 1997, to Gregory D. Rhoten, discloses a device for removably attaching a trailing spinner to a fish hook, using a rigidly spiraled wire that, when rotated about its axis, embraces the shaft portion of the fish hook.

U.S. Pat. No. 5,930,941, issued on Aug. 3, 1999, to Ed Lymon Hayes II and Howard Duke Davenport, II, discloses a fishing lure having three points of support.

U.S. Pat. No. 5,956,886, issued on Sep. 28, 1999, to Chris Choate, discloses a fishing lure with a laterally spaced spinner.

U.S. Pat. No. 5,974,723, issued on Nov. 2, 1999, to Jeff A. Taibi, discloses a weed shielding spinner fishing lure.

U.S. Pat. No. 6,009,658, issued on Jan. 4, 2000, to Herman P. Firmin, discloses a fishing lure with a body having two overlapping heads.

U.S. Pat. No. 6,079,146, issued on Jun. 27, 2000, to Walter A. Larsen, discloses a scent strip for a fishing lure.

U.S. Pat. No. 6,154,999, issued on Dec. 5, 2000, to Todd D. Woods, discloses a fishing lure designed to resemble an insect, having a flat, elongated body formed of a flexible fabric material. It does not disclose the use of cutouts having the shapes of those in the instant invention, nor the use of cyanoacrylate glue.

U.S. Pat. No. 6,161,324, issued on Dec. 19, 2000, to Jim Hugunin, discloses a scent tab for a bucktail fishing lure.

U.S. Pat. No. 6,374,535, issued on Apr. 23, 2002, to David M. Bailey, discloses a fishing lure comprising a crankbait or similar body member to which both a spinner and a hook are attached, having an oscillating, swimming-like motion.

U.S. Pat. No. 6,601,336, issued on Aug. 5, 2003, to Donald J. Link, discloses detachable lure dressings having modular spinner blade assemblies and rattle chambers that mount to elastomer collars and filaments on a fishing lure.

U.S. Pat. No. 6,748,692, issued on Jun. 15, 2004, to Travis Sprouse, discloses a spinner bait, including a head, a hook, a pair of legs, and two or more spinner blades extending from the pair of legs.

U.S. Pat. No. 6,772,553, issued on Aug. 10, 2004, to Rick A. Philips et al., discloses an anti-snag fishing lure, with a spherical body, primary and secondary fish hooks, a deflector (like the present invention's weed guard), and a spinner attached by a connecting ring to a swivel. The instant invention is distinguishable in that it has a molded lead collar (or spout-like extension) extending from the spherical or rounded lead head, it retains the swivel on a metal stem connected by a wire to the collar or head, rather than directly on a spherical body, and it does not have a secondary fish hook. The instant invention is also distinguishable because only it includes microfiber or leather cutouts, and the use of cyanoacrylate glue.

U.S. Pat. No. 6,898,894, issued on May 31, 2005, to James W. Anderson, discloses a fishing jig with interchangeable jig heads.

U.S. Pat. No. 6,962,641, issued on Nov. 8, 2005, to Slane L. Chocklett and Harrison R. Steeves, discloses an arts and crafts material having a foil pattern imprinted on a sheet, portions of which may be cut to form particular shapes, such as the body and tail portions of fishing flies.

U.S. Pat. No. 7,010,881, issued on Mar. 14, 2006, to Jeremy W. Altman, discloses a fishing lure having a body with a hook, and elongated arms to which spinners are attached, with the body formed in a mold that is centrifuged.

U.S. Pat. No. 7,114,285, issued on Oct. 3, 2006, to Jerome Rousseau Ince, discloses a snagless artificial fishing lure with pectoral appendages, and with a snag guard and a top-mounted hook configuration.

U.S. Pat. No. 7,140,146, issued on Nov. 28, 2006, to Andy T. Gill, discloses a jig and bait system, including a body connected to a neck and a bait keeper, and a latch that prevents fish from spitting out a hook. It does not disclose the use of cyanoacrylate glue as in the instant invention, nor the use of cutouts having the shapes of the cutouts in the instant invention.

U.S. Pat. No. 7,140,147, issued on Nov. 28, 2006, to Willard C. Wacha, discloses a jig rig having a metal lip with raised edges to help it sink and wobble when reeled in or let out in water.

U.S. Patent Application Publication No. 2001/0045048, published on Nov. 29, 2001, to Rodney Levelle Johnson, discloses an articulated fishing jig, comprising a weighted head, an arcuate lip extending forward from the head, an eyelet extending from the head, and a hook extending rearward from the head.

U.S. Patent Application Publication No. 2002/0029509, published on Mar. 14, 2002, to Jim Hugunin, is a continuation-in-part of the same patent application that issued as U.S. Pat. No. 6,161,324, noted above.

U.S. Patent Application Publication No. 2002/0078619, published on Jun. 27, 2002, to Michael E. Hurtle, Jr., discloses a tube lure, comprising a flexible tube body having a cavity, and a jig head that fits within the cavity.

U.S. Patent Application Publication No. 2003/0074828, published on Apr. 24, 2003, to Travis Sprouse, issued as U.S. Pat. No. 6,748,692, noted above.

U.S. Patent Application Publication No. 2005/0183323, published on Aug. 25, 2005, to Eric A. Harrell, discloses a jig fish lure having a body and a hook attached to the body, an eye to the rear of the body in a recess, and a passage through the body through which fishing line can pass from the eye through the front of the body.

U.S. Patent Application Publication No. 2006/0042150, published on Mar. 2, 2006, to Warren Edward Roh, discloses a two dimensional fishing lure, formed from a flat base material that is bent to form two images of the lure. A hook is placed between the images, and the hook and images are held together by an adhesive, stitching or mechanical means. The use of cyanoacrylate glue, as in the instant invention, is not disclosed.

U.S. Patent Application Publication No. 2006/0201050, published on Sep. 14, 2006, to Conrad Mark Troutman, discloses a jig-type fishing lure having a jig body with a hook extending from a rear portion of the body and a spinner-type fish attractant located before the front end of the jig body.

French Patent No. 2 569 947, published on Mar. 14, 1986, to Jacques A. Dubert, discloses an artificial fishing bait, comprising a body which simulates a bait, with an attached piece made by moulding a synthetic substance (which may be phosphorescent or luminescent) in order to give it the appearance of live bait.

French Patent No. 2 593 354, published on Jul. 31, 1987, to Jean-Claude Bedu, discloses a lure for carnivorous fish, which may be made from a chicken larynx or a plastic imitation.

Japanese Patent No. 2004-113038, published on Apr. 15, 2004, inventor Kenta Nagai, discloses a blade and spinner bait, with the blade being made of a thin curved plate.

Japanese Patent No. 2004-159633, published on Jun. 10, 2004, inventor Takashi Shutto, discloses a reinforced thin stem wire type bait, having a thin stem hook, and a hairy animal skin trailer.

Japanese Patent No. 2004-275161, published on Oct. 7, 2004, inventor Masahito Fukuda, discloses a lure with a shaft and swivel fixed on one straight line and a blade joined at their rear.

Japanese Patent No. 2005-185255, published on Jul. 14, 2005, inventor Kenji Hirahara, discloses a spinner type bait lure capable of holding a stable swimming/moving posture, having a shaft with two bent parts, and a swivel between the bent parts joined to a fishing line.

Japanese Patent No. 2005-210950, published on Aug. 11, 2005, inventor Kenji Hirahara, discloses a blade for a fishing lure, having a body composed of a curved shield-like plate with a connection hole.

None of the above inventions and patents, taken either singly or in combination, is seen to describe the instant invention as claimed. In particular, the prior art does not disclose the use of cyanoacrylate glue to retain cutouts on a fishing lure, nor the use of cutouts having the shapes of those in the instant invention.

SUMMARY OF THE INVENTION

The present invention is a fishing lure or jig, comprising a weighted head to which a hook, spinner and weed guard are attached. Three cutouts made of a flexible, absorbent material are wrapped around a load collar or extension from the head, and retained by cyanoacrylate glue and/or tied. The cutouts will make the lure resemble a bait fish such as is eaten by the fish that the user wants to catch (or "quarry fish"). The cutouts may be decorated with beads, feathers and paint, to increase the resemblance to a bait fish. The wiggling motion of the jig as it is pulled through the water and the rotation of the spinner will attract fish. Scent may be absorbed by the cutouts to further attract fish. The head is preferably made from lead, which will make it more durable than lures made from plastic or rubber.

Accordingly, it is a principal object of the invention to provide an improved fishing lure that attracts quarry fish by its resemblance to bait fish.

It is another object of the invention to provide an improved fishing lure that attracts quarry fish with motions that resemble the motions of bait fish.

It is a further object of the invention to provide an improved fishing lure that will attract fish by scent.

Still another object of the invention is to provide a durable fishing lure.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a fishing jig including a solid part which I call the "bait hook" and cutouts that can be attached to it.

Figure 1:
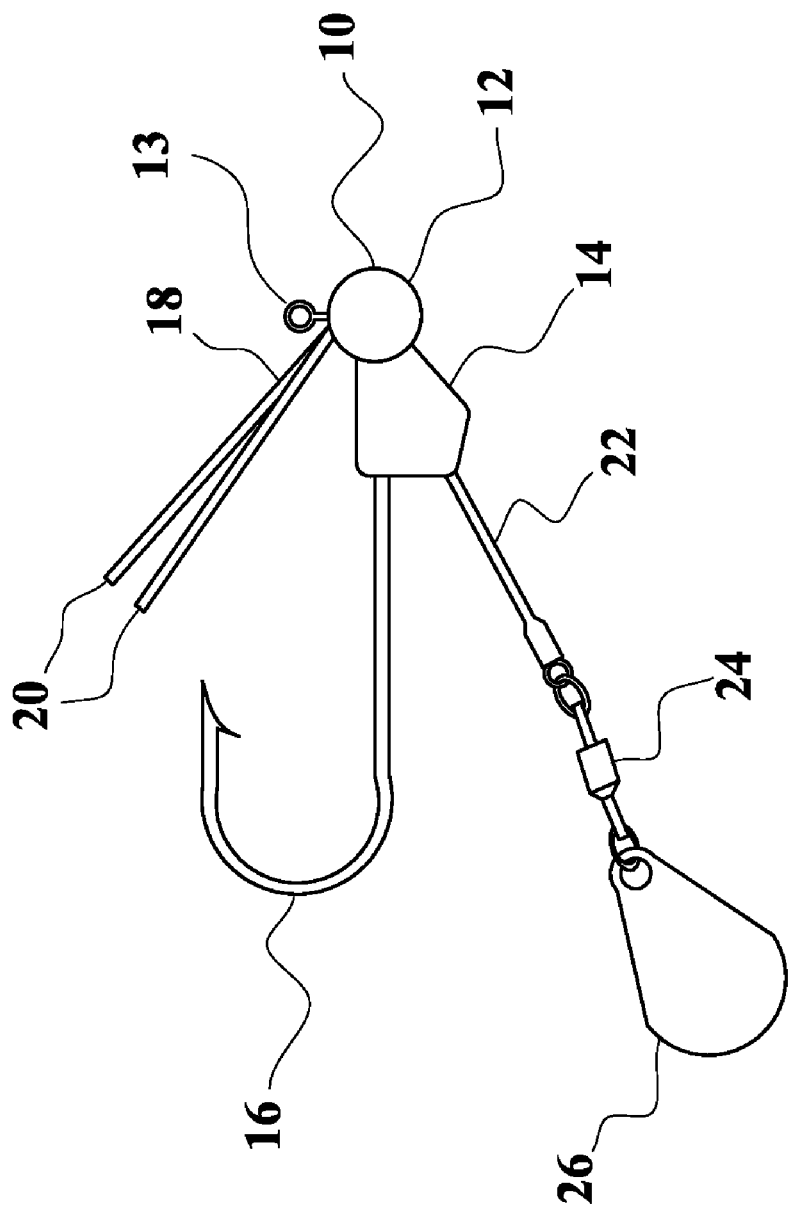
FIG. 1 is a perspective view of the bait hook of the first preferred embodiment of the invention.

The first preferred embodiment of the invention I call the "sticker back". FIG. 1 shows the bait hook 10 for the sticker back, including a molded metal head 12 with eye hook 13, load collar 14, an eagle claw hook 16 embedded in and extending from the load collar, a weed guard 18 having two filaments 20, a stem 22 embedded in and extending from the load collar, a swivel 24 attached to the stem, and a spinner blade 26 attached to the swivel. All of these parts are preferably made of metal, except for the weed guard, which can be made of plastic. The metal head and the load collar are preferably made from lead. The metal head is preferably spherical. The bait hook can come in a variety of weights and sizes, and with different types of spinner blades. The load collar provides balance, and together with the spinner blade, imitates bait fish swimming or struggling, which attracts quarry fish, causing them to bite on the bait hook. The load collar moves the center of gravity backwards, causing the head to point upwards. Thus, the lure will tend to head toward the surface as it is pulled through the water. The head will tend to point upwards even when the lure falls. This causes the lure to resemble prey fish such as minnows heading toward the surface, which tends to attract predatory fish such as bass. A fishing line can be tied to the eye hook. The weed guard can have any number of filaments, but preferably has two filaments in the first embodiment.

Figure 2:
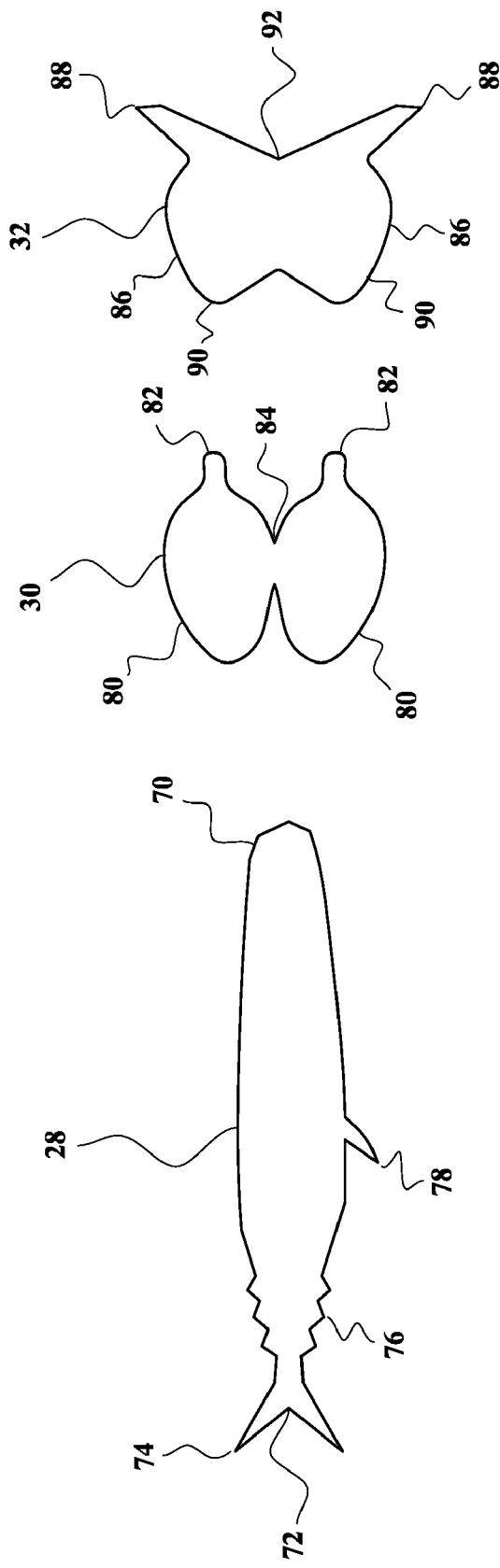
FIG. 2 is a right side elevational view of the cutouts of the first preferred embodiment of the invention.

FIG. 2 shows the cutouts that are attached to the sticker back bait hook. They are preferably made from a microfiber fabric, such as ULTRASUEDE microfiber. (Alternatively, they can be made from leather or tanned animal skins or hides.) The cutouts are stacked over one another and glued using cyanoacrylate glue to the load collar adjacent to the metal head on the bait hook, to form a fishing lure that is an imitation of bait fish eaten by quarry fish. (Cyanoacrylate glue is of exceptional strength, and is sold under trademarks such as SUPERGLUE and KRAZY GLUE.) The cutouts may also be tied to the load collar. (This fly tying method is called "wrapping".) The main body tail plate 28 is the first piece to be wrapped over the load collar. Then the gill and mid-body plate 30 is folded and wrapped over the main body tail plate and the load collar, so that it partially overlaps the main tail plate. Finally, the load mouth plate 32 is wrapped over the other plates and the load collar, so that it partially overlaps the gill and mid-body plate. The overlapping of the cutouts makes them seem more natural, and therefore more attractive and edible to fish. The first cutout, the main body tail plate 28, has a tapering front portion 70, a tapering rear portion 72, a forked rear tail fin 74, indentations 76 adjacent to the tail fin, and one side fin 78. The second cutout, the gill and mid-body plate 30, has two symmetrical and generally oval side portions 80, with small front extensions 82 pointing straight forward from the middle of each side portion, and a narrow connection 84 between the side portions. The third cutout, the load mouth plate 32, has two symmetrical side portions 86, with each side portion having a narrow front extension 88 pointing at an angle from the middle of each side portion, and a wider, rounded rear part 90, and there is a connection 92 between its side portions that is that is more narrow than its side portions, but wider than the connection between the side portions of the second cutout.

Figure 3:
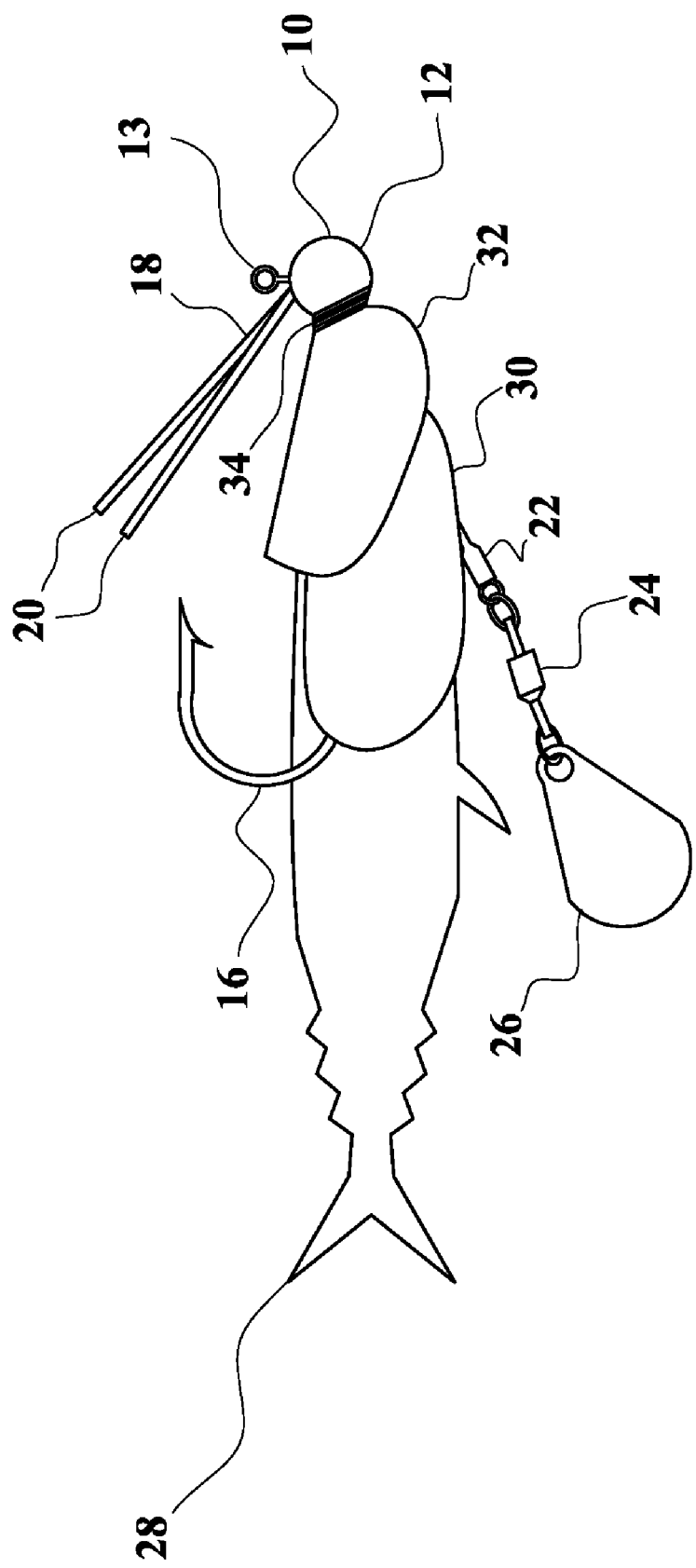
FIG. 3 is a perspective view of the assembled first preferred embodiment of the invention.

FIG. 3 shows the assembled sticker back. The plates are tied to the load collar with thread 34.

Figure 4:
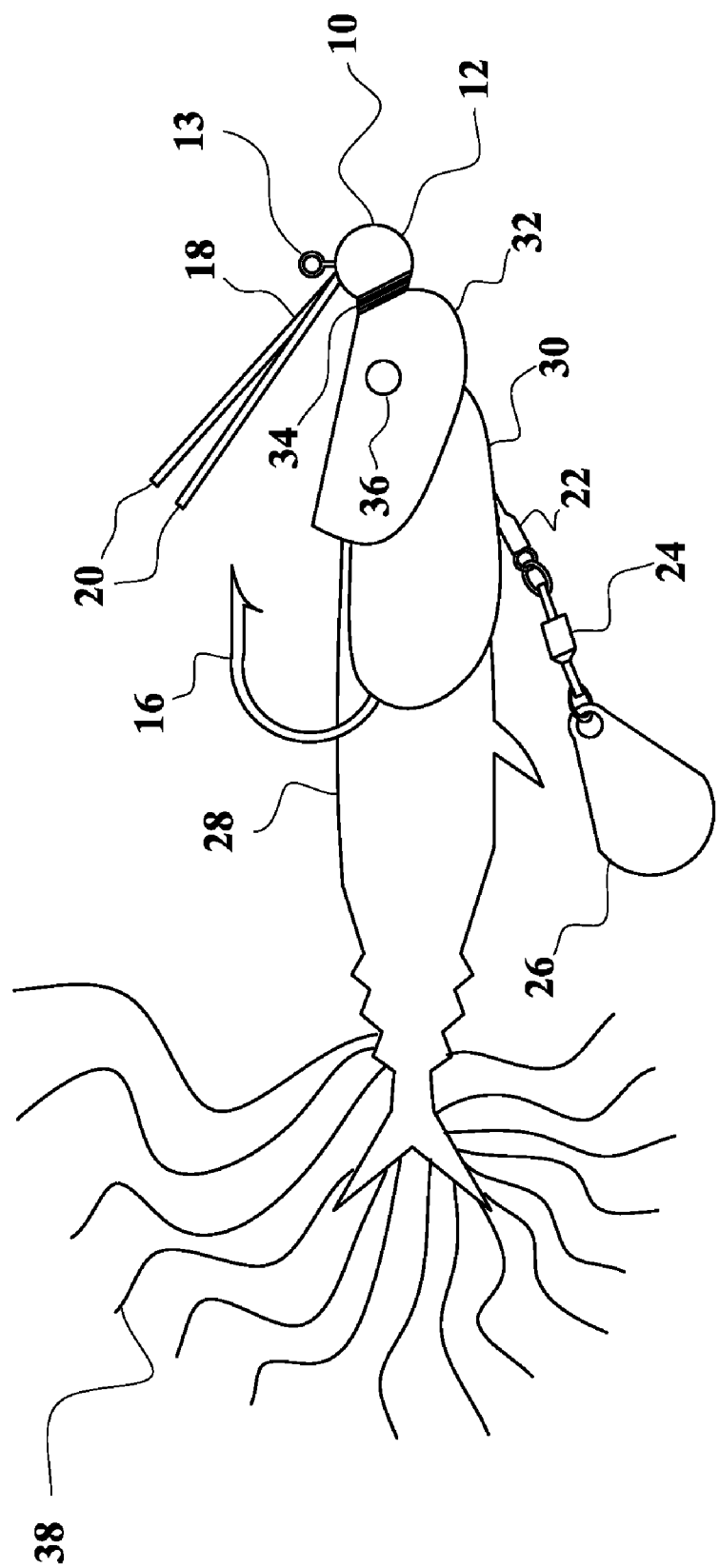
FIG. 4 is a perspective view of the finished first preferred embodiment of the invention.

FIG. 4 shows a finished sticker back, with plastic beads 36 for eyes and feathers 38. Preferably, maribo feathers should be used. The plates may be painted to further attract fish. Acrylic paint may be used on the metal parts. Preferably, the eyes and paint should be red, yellow, gold or silver. The invention will now resemble a minnow and can catch all kinds of fish. It will last for many years of use, outlasting rubber or plastic lures. The plates can absorb scents that attract fish, and slowly release the scents into the water.

Figure 5:
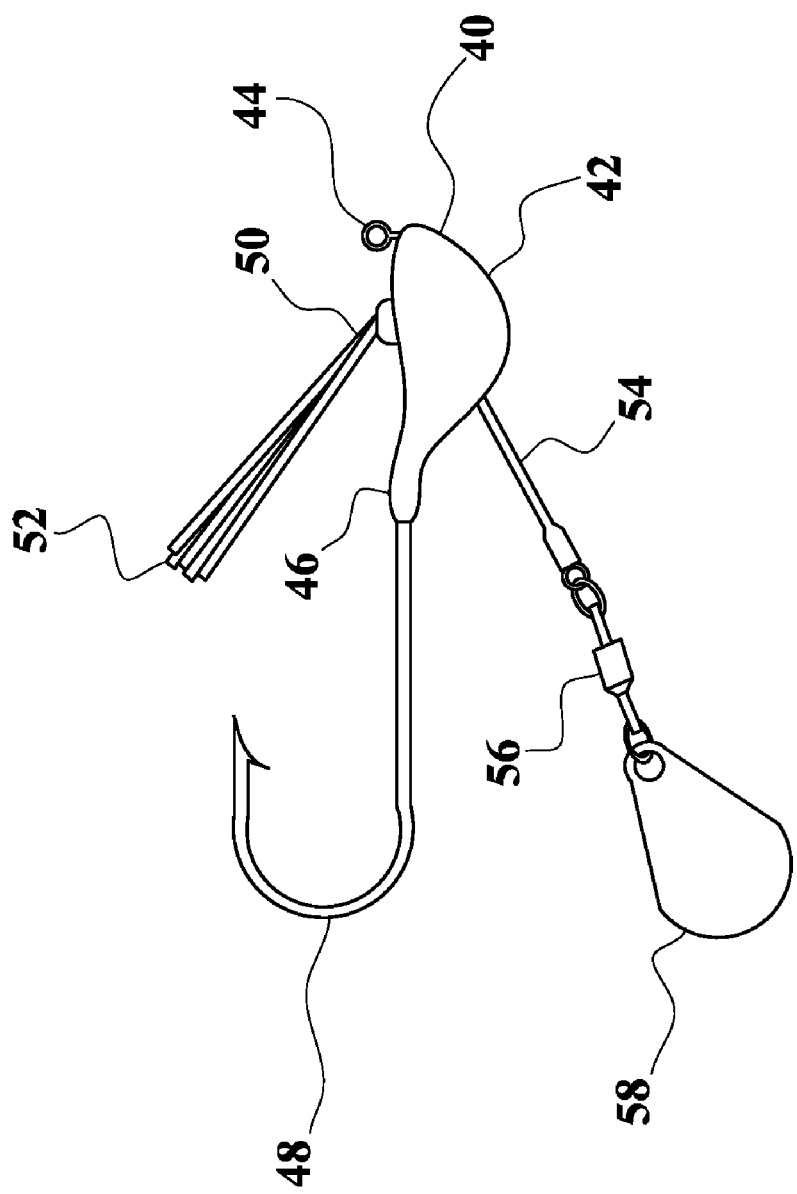
FIG. 5 is a perspective view of the bait hook of the second preferred embodiment of the invention.

The second preferred embodiment of the invention I call the "pop". FIG. 5 shows the bait hook 40 for the pop, including a molded metal head 42 shaped like an ancient oil burning lantern, with eye hook 44, a spout-like extension 46, an eagle claw hook 48 embedded in and extending from the spout-like extension, a weed guard 50 having several filaments 52, a stem 54 embedded in and extending from the bottom of the metal head, a swivel 56 attached to the stem, and a spinner blade 58 attached to the swivel. The weed guard may have any number of filaments, but preferably has several filaments in the second embodiment.

Figure 6:
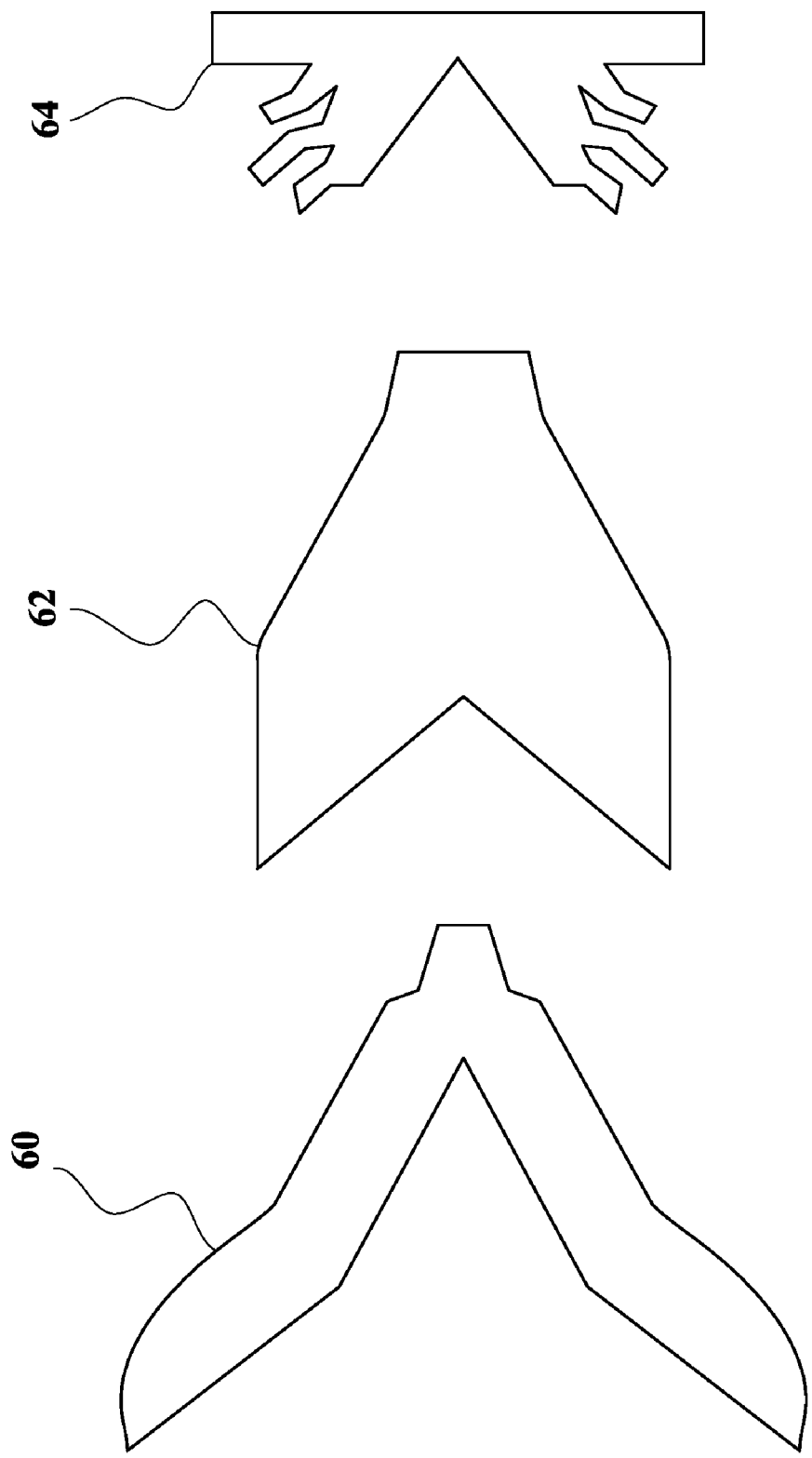
FIG. 6 is a right side elevational view of the cutouts of the second preferred embodiment of the invention.

FIG. 6 shows the cutouts that are attached to the pop bait hook. As in the first embodiment, they are preferably made from a microfiber fabric. The main body tail plate 60 is the first piece to be wrapped over the spout-like extension of the metal head. Then the gill and mid-body plate 62 is folded and wrapped over the main body tail plate and the spout-like extension. Finally, the legs plate 64 is wrapped over the other plates and the spout-like extension.

Figure 7:
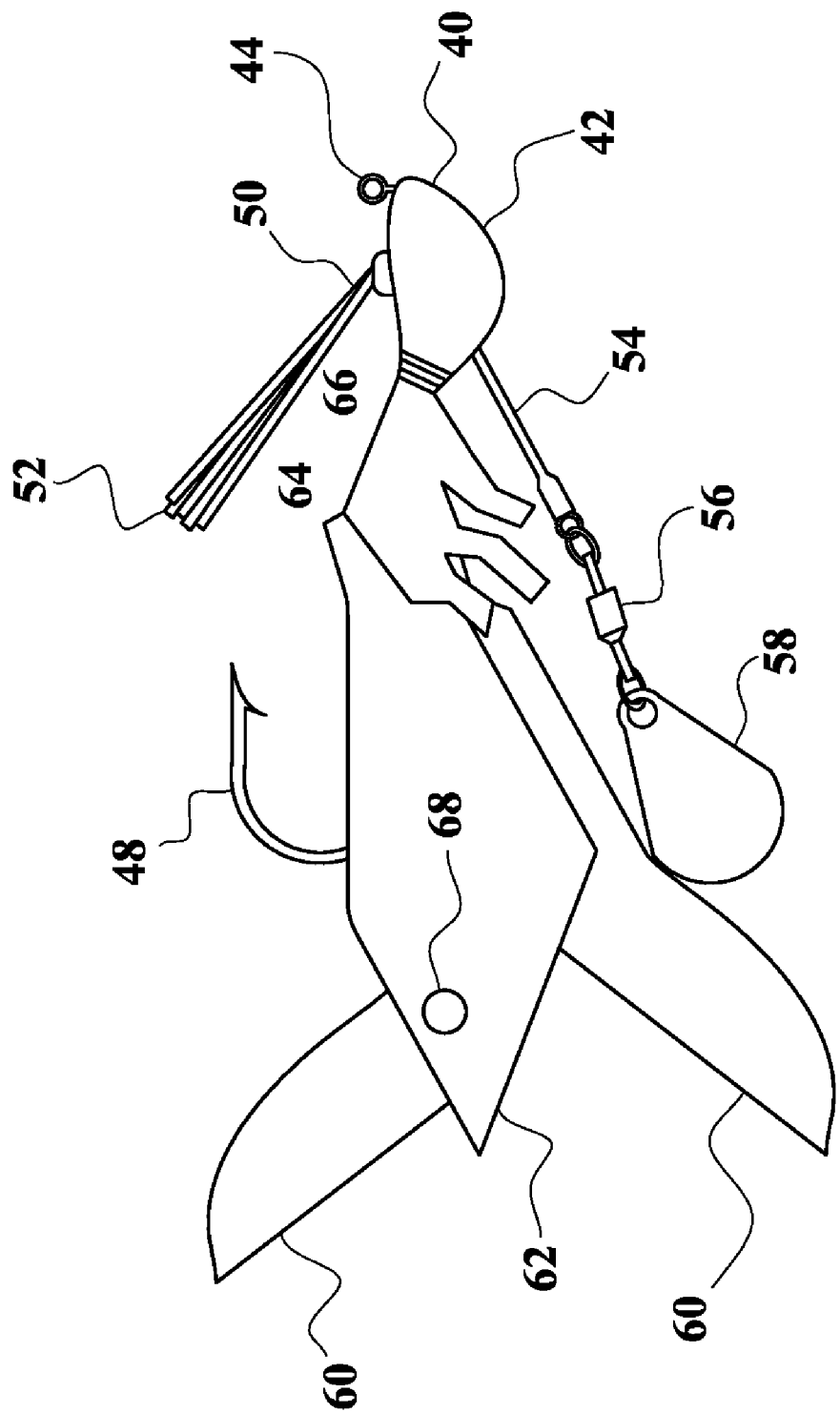
FIG. 7 is a perspective view of the assembled and finished second preferred embodiment of the invention.

FIG. 7 shows the assembled pop. The plates are tied over the spout-like extension with thread 66. Plastic beads 68 may be attached for eyes. As in the first embodiment, paint and feathers may also be used. Except as stated in this specification or shown in the drawings, the second embodiment is constructed in essentially the same way as the first embodiment.

It is to be understood that the present invention is not limited to the embodiments described above, but encompasses any and all embodiments within the scope of the following claims.

I claim:

1. A fishing jig, comprising:
   a spherical metal head;
   a metallic load collar, said load collar having a narrow end attached to the metal head, and a wide end opposite said narrow end attached to the metal head;
   a hook embedded in and extending from the load collar;
   a spinner blade connected to the load collar;
   a plurality of cutouts made from a flexible material, that are placed over the load collar, and retained with cyanoacrylate glue, wherein the cutouts include a first cutout that is placed closest to the metal head, a second cutout that is placed over and partially overlaps the first cutout, and a third cutout that is placed over and partially overlaps the second cutout, wherein the flexible material that the cutouts are made from can absorb and release scents that attract fish, and wherein the first cutout is elongated with tapering front and rear portions, a forked rear tail fin, indentations adjacent to the tail fin, and one side fin;
   a weedguard, having one or more filaments, extending from the metal head, and retained on the metal head by cyanoacrylate glue; and
   a swivel, having a first end connected by a stem to the load collar, and a second end connected to the spinner blade.

2. The fishing jig according to claim 1, wherein the flexible material that the cutouts are made from is a microfiber fabric.

3. The fishing jig according to claim 1, wherein the flexible material that the cutouts are made from is leather.

4. The fishing jig according to claim 1, wherein the second cutout has two symmetrical and generally oval side portions with a small front extension pointing straight forward from a middle of each side portion, and a narrow connection between the side portions.

5. The fishing jig according to claim 4, wherein the third cutout has two symmetrical side portions, with each side portion of the third cutout having a narrow front extension pointing at an angle from a middle of each side portion of the third cutout, and a wider, rounded rear part, and there is a connection between said side portions of said third cutout that is more narrow than said side portions of the third cutout, but wider than the connection between the side portions of the second cutout.

6. The fishing jig according to claim 5, wherein the cutouts are tied to the load collar.

7. The fishing jig according to claim 6, wherein a weight of the load collar moves a center of gravity of the fishing jig backwards, causing the metal head to point upwards during use.

* * * * *